(12) United States Patent
McDaniel et al.

(10) Patent No.: US 8,903,693 B2
(45) Date of Patent: Dec. 2, 2014

(54) BOUNDARY HANDLING FOR PARTICLE-BASED SIMULATION

(75) Inventors: Richard Gary McDaniel, Hightstown, NJ (US); Zakiya Tamimi, Kent, OH (US)

(73) Assignee: Siemens Aktiengesellschaft, Munich (DE)

( * ) Notice: Subject to any disclaimer, the term of this patent is extended or adjusted under 35 U.S.C. 154(b) by 424 days.

(21) Appl. No.: 13/314,480

(22) Filed: Dec. 8, 2011

(65) Prior Publication Data

US 2012/0330628 A1    Dec. 27, 2012

Related U.S. Application Data

(60) Provisional application No. 61/500,658, filed on Jun. 24, 2011.

(51) Int. Cl.
| | |
|---|---|
| *G06F 17/50* | (2006.01) |
| *G06T 17/00* | (2006.01) |
| *G06T 13/20* | (2011.01) |
| *G06T 13/60* | (2011.01) |

(52) U.S. Cl.
CPC ............ *G06F 17/5018* (2013.01); *G06T 13/20* (2013.01); *G06T 17/00* (2013.01); *G06T 13/60* (2013.01); *G06T 2210/21* (2013.01); *G06T 2210/24* (2013.01); *G06T 2210/56* (2013.01); *G06F 2217/16* (2013.01)
USPC .................. 703/9; 703/2; 345/474; 345/420

(58) Field of Classification Search
None
See application file for complete search history.

(56) References Cited

U.S. PATENT DOCUMENTS

| | | | | |
|---|---|---|---|---|
| 7,813,903 | B2 * | 10/2010 | Stam ................................ | 703/2 |
| 2009/0083015 | A1 | 3/2009 | McDaniel | |
| 2010/0094608 | A1 * | 4/2010 | Oh et al. ........................... | 703/9 |
| 2011/0282641 | A1 * | 11/2011 | Xenos et al. .................... | 703/19 |

OTHER PUBLICATIONS

Larsson, Thomas "Adaptive Bounding Volume Hierarchies for Efficient Collision Queries" PhD Thesis, Mälardalen U. (2009).*
Eitz, Mathias & Lixu, Gu "Hierarchical Spatial Hashing for Real-time Collision Detection" IEEE Int'l Conf. on Shape Modeling and Applications (2007).*
Solenthaler, B. & Pajarola, R. "Density Contrast SPH Interfaces" Eurographics / ACM SIGGRAPH Symp. on Computer Animation, pp. 211-218 (2008).*
Kallberg, Linus & Larson, Thomas "Ray Tracing Using Hierarchies of Slab Cut Balls" Eurographics (2010).*
T. Larson et al., "Bounding Volume Hierarchies of Slab Cut Balls," Computer Graphics forum, vol. 28 (2009), No. 8 pp. 2379-2395.
European Search Report mailed Apr. 25, 2014 corresponding to EP Application No. 12173259.8 filed Jun. 22, 2012 (6 pages).
Steinbrener S. V. Ed. et al; "Section IV. Status Quo of Case Law on Computer-Implemented Inventions"; Software Patents Worldwide, Kluwer; pp. 40-101; XP009167835;; 2011; Jun. 1, 2011.

* cited by examiner

*Primary Examiner* — Kamini S Shah
*Assistant Examiner* — Jay B Hann

(57) ABSTRACT

Boundary handling is performed in particle-based simulation. Slab cut ball processing defines the boundary volumes for interaction with particles in particle-based simulation. The slab cut balls are used for collision detection of a solid object with particles. The solid object may be divided into a plurality of independent slab cut balls for efficient collision detection without a bounding volume hierarchy. The division of the solid object may be handled in repeating binary division operations. Processing speed may be further increased by determining the orientation of each slab cut ball based on the enclosed parts of the boundary rather than testing multiple possible orientations.

21 Claims, 2 Drawing Sheets

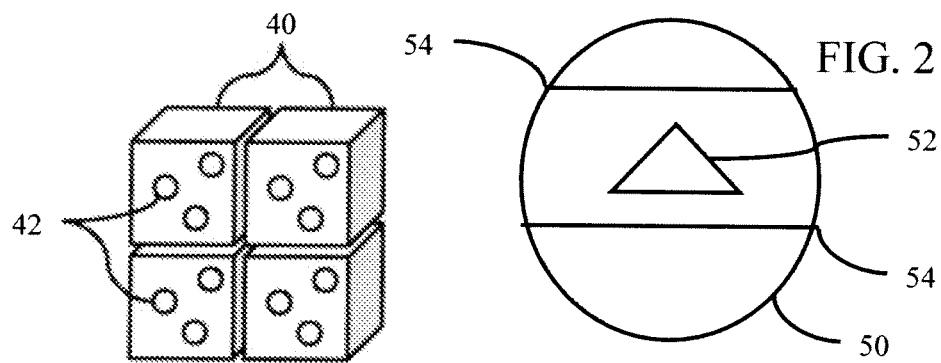
FIG. 2
FIG. 4
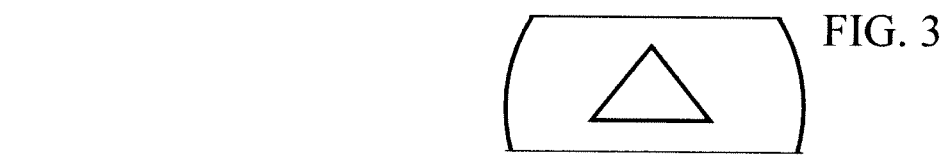
FIG. 3
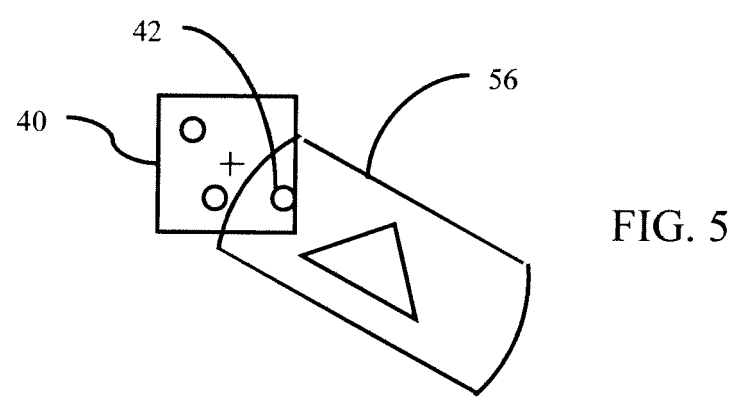
FIG. 5

BOUNDARY HANDLING FOR PARTICLE-BASED SIMULATION

RELATED APPLICATIONS

The present patent document claims the benefit of the filing date under 35 U.S.C. §119(e) of Provisional U.S. Patent Application Ser. No. 61/500,658, filed Jun. 24, 2011, which is hereby incorporated by reference.

BACKGROUND

The present embodiments relate to particle-based fluid simulation of interaction with a solid object. The interaction of the solid object with fluid may be modeled in different ways.

In computational fluid dynamics (CFD), a boundary condition is a numerical condition defined at simulation space borders as well as the surfaces of solid objects within the simulation environment. Examples of boundary conditions include the no-penetration condition where the velocity normal component is zero and the free-slip condition where tangent velocity component is unchanged. Since a boundary condition applies only at a surface, both condition terms are used interchangeably. In grid-based fluid simulation, solid surfaces are handled as the boundary condition of a finite differences problem.

In a particle-based simulation approach for CFD, such as smoothed particle hydrodynamics (SPH), there is no well-defined boundary handling technique. To resolve a collision between a particle and a surface, some simple methods have been used, such as to push the colliding particle out of the solid surface and reverse its velocity normal component. However, in cases where solid objects can be moved as a result of fluid interaction, such as floating objects, a simple reflective boundary may not predict the force to be applied on the solid object.

In order to decide which particles are potentially in collision with a surface, some spatial hashing method, such as a 3D grid, is used to map between boundaries and potential fluid particles. Such approach works well in a static boundary case. However, this approach may be computationally expensive in the case of moving solid objects since the mapping is updated or re-calculated in each simulation step (over time as the object moves).

SUMMARY

In various embodiments, systems, methods and computer readable media are provided for boundary handling in particle-based simulation. The solid object can be represented in various modeling methods. A common method is to divide the solid's surface into a triangle mesh. Doing comparison for every triangle in the mesh to every particle would be too time expensive to compute for most realistic cases so the mesh is enclosed in a boundary volume that can be tested more efficiently.

Slab cut ball processing defines the boundary volume for interaction with particles in particle-based simulation. The slab cut ball is used for initial collision detection of a solid object with particles. If a particle is found to be within the bounding volume, more computationally intensive tests are made to determine if the actual surface is met. The solid object may be divided into a plurality of independent slab cut balls for efficient collision detection without requiring a bounding volume hierarchy. The division of the solid object may be handled in repeating binary division operations that divides the object's mesh triangles or other primitives. The orientation of the slab cut ball may be determined more precisely based on the minimum width of the enclosed parts of the boundary rather than using a fixed set of possible orientations. This allows the slab cut ball to match the geometry more precisely and potentially improve performance. Any one or more of these features may be used alone or in combination.

In a first aspect, a method is provided for boundary handling in particle-based simulation. A processor divides a solid object into a plurality of fragments. The processor forms a slab cut ball for each of the fragments of the plurality. A three-dimensional distribution of simulated particles grouped into cells is defined by the processor. The processor maps the slab cut balls for the fragments to the cells and detects a collision of at least one simulated particle of one of the cells with one of the fragments. The processor calculates an interaction force of the collision.

In a second aspect, a non-transitory computer readable storage medium has stored therein data representing instructions executable by a programmed processor for boundary handling in particle-based simulation. The storage medium includes instructions for separating a mesh of primitives representing an object into sub-sets of primitives, and detecting collision of particles with the object as a function of bounding volumes comprising slab cut balls.

In a third aspect, a non-transitory computer readable storage medium has stored therein data representing instructions executable by a programmed processor for boundary handling in particle-based simulation. The storage medium includes instructions for creating independent bounding volumes of the boundary as slab cut balls, and detecting collision of particles of fluid with the boundary as a function of the slab cut balls.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

FIG. 2 is an illustration of components for forming a slab cut ball according to one embodiment;

FIG. 3 is an illustration of the slab cut ball formed from the components of FIG. 2;

FIG. 4 is an illustration of one embodiment of dividing a particle distribution into cells;

FIG. 5 is a two-dimensional representation of mapping the slab cut ball of FIG. 3 to one of the cells of FIG. 4;

DETAILED DESCRIPTION OF EMBODIMENTS

Particle-based fluid simulation methods, such as smoothed particle hydrodynamics (SPH), may be used to achieve interactive fluid simulation. To provide simulation with bodies within the fluid and maintain interactive speeds, fast boundary handling is provided to couple the particle-based fluid simulation with the other bodies. To be interactive, the simulation is generally updated on a per cycle basis in milliseconds. Therefore, the computation of the fluid interaction with boundaries is done efficiently to maintain interactive speeds. An efficient method to handle large, complex, and movable solid objects at interactive speed may be provided using slab cut balls. An easy to compute and update mapping between solid objects and fluid particles results in only particles within proximity of the solid surface being tested for collision.

The goal is to efficiently map between fluid particles and solid object primitives at each simulation step. Slab cut balls are used as the boundary volume. No bounding volume hierarchy is required to increase computational efficiency. The size of the slab cut balls is managed so that the size of each is larger than the size of grid elements, such that the testing of each boundary volume will be independent of other boundary volumes because the boundary volumes will each be involved with different sets of grid cells. Also, the number of geometry elements, such as mesh triangle primitives, can be controlled so that the maximum number of elements does not exceed a number such as 100, 10, or other limited number of primitives. The solid object is divided in a way similar to hierarchy construction, such as repeating a binary division until the object is divided into parts with a sufficiently small number of primitives. For each slab cut ball as the boundary volume, the center, radius, and plane distances are calculated based on the primitives that its encloses.

For particle-based fluid simulation, the particles are separated into a regular area of grid cells. The size of the grid cell dimensions are selected so that the average number of particles within a cell will not exceed a desired number. To compute collisions between particles and solids, the boundary volumes of the solids are mapped to a block of grid cells so that particle collision testing can be restricted to only those in the affected volume as opposed to testing all particles in the simulation to every solid object. The grid cells define particle distribution and are also used to calculate the evolution of the fluid simulation. Collision resolution calculates the external forces applied to a fluid particle in collision. Applying the equal and opposite reaction force to the body provides a natural way for two-way coupling.

Figure 1:
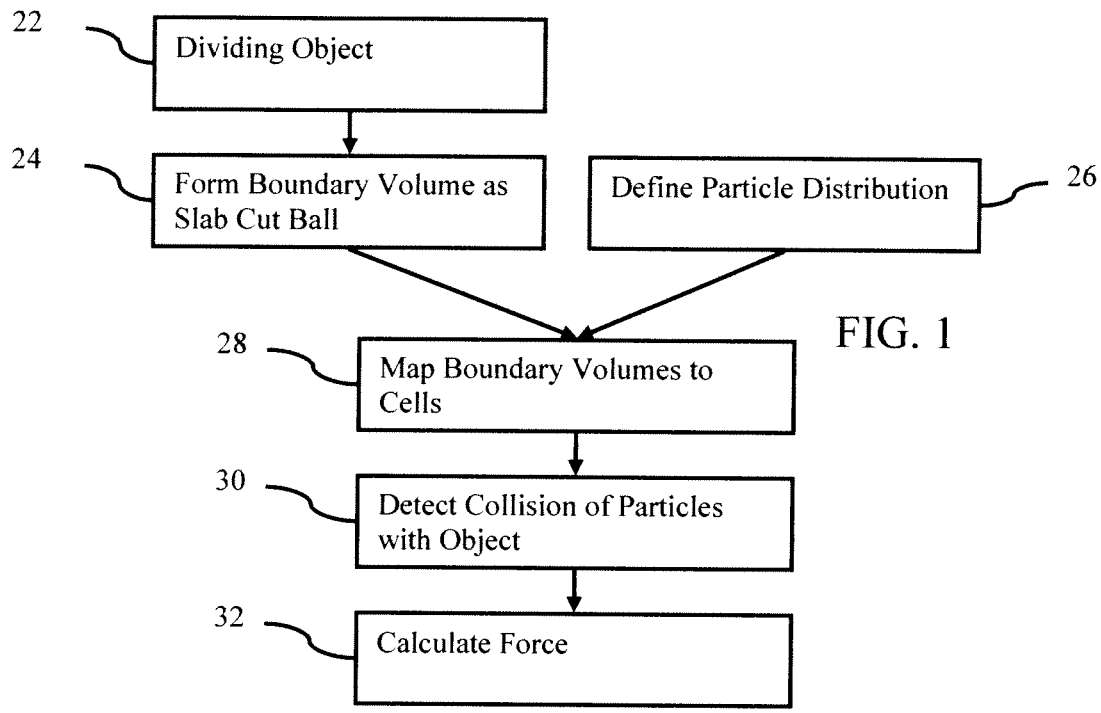
FIG. 1 is a flow chart diagram of one embodiment of a method for boundary handling in particle-based simulation.

FIG. 1 shows a method for boundary handling in particle-based simulation. The method is implemented by the system of FIG. 6 and/or a different system. A processor performs the acts. Additional, different, or fewer acts may be provided. For example, act 22 is not performed where the solid object being modeled is small or not to be divided. Act 32 may not be performed if there are no collisions detected. As another example, acts 28 and 30 are combined into one act. In yet another example, additional acts of moving the object, reorienting the boundary volumes as a result of the movement, and adjusting the particle motion are provided. Any further particle-based fluid simulation acts may be added.

The method is provided in the order shown. Acts 22 and 24 may be performed sequentially or in parallel with act 26. Other orders may be provided. In one embodiment, acts 22, 24, and 26 are part of initialization performed prior to simulation. The interaction of the solid object with the fluid is simulated without further performing the initialization acts. Acts 28, 30, and 32 are repetitively or iteratively performed as part of simulating fluid flow around or against a solid object. In the simulation, the internal forces acting on the simulated particles and the forces between the particles and one or more solid objects are repetitively calculated. The solid object, if moveable, is advected within the fluid as a function of the calculated collisions with the particles modeling the fluid.

In an example of the method of FIG. 1, preprocessing is performed. A large solid object is divided into small fragments of one or more primitives each, and then each fragment is enclosed by a slab cut ball bounding volume that translates and rotates as the solid object moves. During simulation, the mapping between the bounding volumes and blocks of grid cells is found. This mapping can be considered a kind of broad-phase collision test. For each non-empty grid cell intersecting a bounding volume, a collision test is applied for each particle within the cell against bounding volume of the fragment. Particles found to be within the bounding volume are further tested against the primitives of the fragment to determine actual collisions. When collision is detected, boundary forces are calculated and applied as an external force on the colliding particles and the opposite direction forces are applied to the object as reaction forces.

In act 22, one or more solid objects are divided into a plurality of fragments. The solid object is a block, oar, hull, animal, or other object interacting with fluid. The solid object may be immobile or static, such as representing a post or wall. The solid object may be mobile, such as a floating object (e.g., hull). Interactive objects may be shifted by the fluid and may influence the fluid as well (e.g., a floating wooden box). The solid object may be subject to outside forces, such as an oar being moved by a rower, a prop being moved by a motor, or a fish moving itself. The solid object may be free floating or not subject to motor or muscle force, such as a floating log or a sinking rock. Dynamic objects may be moved, such as under gravity, user applied force, and by the forces of the fluid. Static objects may not be moved regardless of force (e.g. the walls of an immobile containment vessel). The solid object may have a fixed surface or may have a flexible surface (e.g., skin or other deformable material).

For simulation, the solid object's surface is modeled as primitives, such as a mesh of triangles. Other potential primitives include quadrilaterals, hexagons, pentagons, circles, spheres, cubes, splines, combinations thereof, or other shapes. The primitives include vertices joined by edges and filled by a surface to represent the surface structure. Each primitive represents part of the surface of the solid object. The object may be represented by many primitives, such as hundreds, thousands, or more. The primitives are grouped into separate fragments for the simulation.

The primitives can be planar, where each would have a predetermined normal direction (orthogonal to the primitive). Non-planar primitives may be used in which case a normal direction can be assumed or calculated from the shape of the primitive. The primitive is also labeled to indicate the internal or external side of the solid object. The labeling distinguishes from inside and outside the solid object when performing collision resolution.

The mesh of primitives representing an object is separated into sub-sets of primitives. The sub-sets of primitives may be separated into other sub-sets (e.g., sub-set of a sub-set). Alternatively, each separated sub-set is of the desired size for a fragment.

The desired sub-set of primitives is a fragment. The fragment is of one or more primitives up to a maximum. Any maximum criteria may be applied, such as a maximum surface area, a maximum number of primitives, or other criteria. The primitives are separated into the fragments until each sub-set of primitives is less than the maximum. The separation is iteratively performed until the solid object with the large number of primitives is divided into small subsets of primitives or fragments.

The primitives for a given fragment are connected or not connected. For example, the solid object may include closely spaced parallel or non planar walls such that selecting a cutting plane intersecting the walls divides at least one set into disconnected primitives. The connection of the walls is located in a different fragment. The primitives of any given fragment are related by location—are within a volume region.

Each fragment is to be enclosed in a bounding volume. The bounding volume has a size based on the given simulation. When the number of primitives in a solid object is sufficiently large that the object cannot fit in one bounding volume, the object is divided into the fragments. The number of primitives may be too large to assign a unique bounding volume for each. Thus, there are one or more primitives per fragment, and there are one or more fragments per object.

A constraint on the division is that each primitive is associated with one and only one fragment. Where the size of the primitive is sufficiently large to not fit within a given bounding volume, the primitive may be divided into multiple coplanar primitives.

To divide the solid object, the entire object is bounded by an axis aligned bounding box. Other conceptual models may be used. Alternatively, a bounding box for the initial solid object or for division of the mesh is not provided. The division of the mesh may separate out the fragments sequentially, such as separating out the primitives forming each fragment in sequence (e.g., separate out fragment 1, then fragment 2, then fragment 3 . . . ). Alternatively, binary division is iteratively performed. An axis aligned bounding box of the solid object or part of the solid object is divided into two parts. This binary separation of the mesh is repeated until the sub-sets of primitives associated with the parts are less than a threshold volume, size, or the number of primitives is sufficiently small. The binary division of the remaining parts continues until fragments of the desired size result.

In one example embodiment, a solid object is divided into fragments. Given a solid object as a list of primitives, with a pre-computed axis aligned bounding box, and the maximum size of a fragment, a recursive algorithm divides the mesh into fragments of a size less than maximum size. In each function call or iteration, the volume of the axis aligned bounding box around the given part of the object (whole object in the first iteration) is compared against the maximum for the fragment. If the axis aligned bounding box is less than or equal than the maximum, a bounding volume is created for that fragment and the recursion is terminated. Otherwise, the part (e.g., primitives of the current sub-set) is split into two sub-lists using a pivot plane and recursive calls (repetition or iterations) are performed for the resulting sub-lists.

The pivot plane is chosen as a plane that intersects the center of the axis aligned bounding box where the normal of the plane is parallel to the longest dimension of the axis aligned bounding box. The pivot plane is compared against a centroid point of every primitive in the list (i.e., primitives of the current part of the object) and classified as whether the centroid point is above or below the plane. Primitives with centroids on one side of the plane are grouped as a part. Each time the list is split in two, a new axis aligned bounding box (AABB) is calculated for each resulting part or sub-list. The process continues until all parts are considered fragments of the desired size range.

An example code representing this embodiment is provided as:

```
Input: list of primitives {Ti: i:0 .. n}, AABB {min, max}, maxV
Output: fragment: list {Ti: a..b}
Split(Ti: 0..n)
    if AABB <= maxV
        Create BV(Ti: i:0..n)
        return;
    Calculate pivot
    L = R = 0
    While T[R] < pivot
        R++
        Update AABB-left(T[R])
    For k = r + 1 ... n
        if (T[k] < pivot )
            Swap (T[k], T[R])
            Update AABB-left(T[R])
            R++
        else
            Update AABB-right(T[k])
    Split (Ti: 0 .. r−1)
    Split (Ti: r..n)
``` where maxV is a maximum volume for a fragment, BV is the bounding volume, AABB is the axis aligned bounding box, pivot is the pivot plane, and left and right are the parts resulting from the binary division.

Other approaches may be used. For example, the object may be divided into thirds or other non-binary numbers of parts for each iteration.

In act 24, a bounding volume is formed for each fragment. Tens, hundreds or more bounding volumes are formed. The relation between a fragment and its enclosing bounding volume does not change during simulation. The formation may be generated only once for a given simulation or sequence of simulations. In alternative embodiments, the surface of the object changes shape, so the relationship may be altered in response to such changes.

In one embodiment, the bounding volumes are formed as slab cut balls. An example usage of slab cut balls is shown in "Bounding Volume Hierarchies of Slab Cut Balls," Computer Graphics forum, vol. 28, no. 8, pgs 2379-2395 (2009). This example usage is of the bounding volumes of colliding solid objects. Several differences exist in the use of the slab cut balls as bounding volumes in particle-based fluid simulation.

The slab cut ball is formed as the bounding volume for each fragment. Each slab cut ball is defined based on the sub-set of primitives of the respective fragment. Once a solid object is divided into fragments, the initialization process assigns a bounding volume to each fragment.

The slab cut balls of each fragment are formed independently of the slab cut balls for the other fragments. These bounding volumes may rotate and/or translate differently or the same. These bounding volumes may have the same or different volume. The creation of independent bounding volumes may allow for collision detection without needing a bounding hierarchy. Rather than rely on a pyramidal scheme to spatially isolate the location of a given bounding volume, each bounding volume is independently translated into the particle grid cells with which the bounding volume overlaps.

A slab cut ball bounds the volume of each fragment. The slab cut ball is formed from a sphere (3D) or circle (2D) from which a slab is cut. Two planes define the part of the ball forming the slab. For three-dimensional simulation, each slab cut ball is formed from a sphere with two parallel cutting planes. A sphere alone is not a compact bounding volume. However, a sphere may be a good choice when a fragment rotates in location. The cutting planes add compactness and thus efficiency. In one embodiment, a slab cut ball is defined as $\{C, R, \hat{n}, d_1, d_2\}$, where C (a 3-tuple) denotes a sphere center, R (a scalar value) denotes a sphere radius, (a 3-tuple) denotes a cutting-plane normal, and $d_1$ and $d_2$ (two scalar values) denote cutting-plane distances. Other representations may be used.

In one example embodiment, a fragment, f, which is a list of primitives, is input. Each primitive has a pre-calculated centroid point, denoted A. The centroid of the slab cut ball is determined from the centroids of the primitives in the fragment. The center of the bounding volume is denoted as $C_f$. $C_f$ is defined in equation 1, where N is the number of primitives in fragment f, and $A_j$ is the centroid of primitive j.

$$C_f = \frac{1}{N} \sum_j A_j \qquad (1)$$

The size of the bounding volume is based on the fragment. A radius from the centroid of the slab cut ball is based on the primitives. The radius that forms a sphere enclosing all of the vertices of the primitives is determined. FIG. 2 shows an example in two-dimensions. The circle 50 has a radius enclosing the fragment 52. The radius of fragment, f, is denoted as $R_f$. $R_f$ is defined in equation 2 as the maximum distance between any vertex and the center $C_f$. The vertex $v_x$ is for some primitive in fragment, f.

$$R_f = \sqrt{\max_{x \in f}(C_f - v_x)^2} \qquad (2)$$

The orientation of the slab cut ball is determined from the primitives of the fragment. For example, the orientation is determined from a normal direction of one or more primitives of the fragment. The orientation of each slab cut ball is a function of a normal of at least one primitive of the boundary associated with the bounding volume. In one embodiment, an average normal of all the primitives in the fragment may be calculated. The average normal indicates an axis along which the orthogonal cutting planes are positioned. The cutting-planes are parallel and share the same normal, $\hat{n}_f$. The normal $\hat{n}_f$ is defined in equation 3 as the average normal of all primitives within a fragment. $\hat{n}_j$ is the normal for primitive j.

$$\hat{n}_f = \frac{1}{N} \sum_j \hat{n}_j \qquad (3)$$

Alternately, the orientation of the slab cut ball may be determined using an oriented bounding box of the fragment. The oriented bounding box can be tilted so that the volume of the box is smaller than an axis-aligned bounding box. The direction of the slab cut ball axis can be chosen to be parallel to the direction of the oriented bounding box with the smallest dimension. Another method to find the orientation of the slab cut ball is to find the convex hull of the fragment. Each side of the convex hull can be tested to see how far the points opposite that side are from the plane of that side. The normal of the side with the smallest distance can be chosen as the direction of the slab cut ball axis.

The normal of the slab cut ball defines the axis along which the cutting planes are positioned. FIG. 2 shows the cutting planes 54 positioned along the calculated normal (vertical) of the primitives (lines) of the fragment 52.

The cutting planes 54 are positioned at different distances along the normal. The distances are relative to the center of the slab cut ball or other location. For example, the cutting planes distances $d_1$ and $d_2$ are relative to $C_f$. The distances are calculated so that the primitives (e.g., all vertices) of the fragment 52 are between the cut planes 54. The distances are defined as the maximum and minimum projection perpendicular to the normal axis of the vertices with a greatest distance between each other along the normal. The distances are shown in equations 4 and 5.

$$d_1 = \max_{x \in f}(v_x \cdot \hat{n}_f) - C_f \qquad (4)$$

$$d_2 = \min_{x \in f}(v_x \cdot \hat{n}_f) - C_f \qquad (5)$$

Since the bounding volumes are mapped to the particle grid cells to detect collision with particles, the bounding volume may be adjusted or scaled to account for particles at or near the grid boundaries. The particles may be modeled as within cells, such as cubes. $d_1$, $d_2$, and $C_f$ of the bounding volume may be adjusted to account for the size of each cell so that the volume will certainly overlap all cells where particle collisions are possible. For example, the radius and the distances from the centroid have an adjustment added. For example, $$\frac{h\sqrt{2}}{2}$$

is added to the radius, and the distances from the centroid to include partially intersecting cells and extend the overlap region. If the distances $d_1$, $d_2$ are both defined in the same direction along the axis, then the adjustment distance is subtracted from the lower distance ($d_2$). h is the diagonal of the cube size for each cell. Other adjustments may be provided.

FIG. 3 shows a slab cut ball 56 for the fragment 52. The slab cut ball 56 includes the cut planes and a part of a sphere centered at the centroid of the slab cut ball and having the radius. The part of the sphere between the cut planes is the interior volume of the slab cut ball.

In act 26, a two or three-dimensional distribution of simulated particles is defined. The particles are points representing in aggregate the fluid being simulated. The particles may be associated with characteristics and/or be treated as two or three-dimensional shapes. Since the particles are used for simulating fluid, the particles are dispersed with a regular density throughout a volume. Irregular density may be used, such as modeling the effects of temperature differences on the density of fluid.

For simulation, the particles are grouped into cells. To solve the association problem between fluid particles and solid object primitives, the simulation space is subdivided into a three-dimensional (3D) grid such that a fluid particle is located in only one cell during any simulation step. Such spatial subdivision is natural in smoothed particle hydrodynamics (SPH) for the purpose of neighbor finding.

Any number of cells and particles per cell may be used. The number of particles per cell is the same or different for different cells. In one embodiment, the number of particles per cell is small, such as less than 100, 10 or other number. Any number of cells may be provided. The number of cells and corresponding volume of the cells may be determined based on the particle density, number of particles per cell, and the simulation volume of the fluid.

The particles are grouped into a three-dimensional distribution of cells. FIG. 4 shows four such cells 40, each including particles 42. The cells have a same size and shape, but may have different sizes and shapes. The number and arrangement of particles within each cell may be different.

Each cell is defined as a function of a three-dimensional location of a center of the cell and a list of the simulated particles within the cell. In one embodiment, each cell is defined by a list of fluid particles objects in the cell, a length of list (a scalar value), a center of the cell (a 3-tuple), and an empty flag (a Boolean value) to distinguish cells with particles from cells without particles. In alternative embodiments, the center and/or the empty flag are not separately stored as the empty nature may be determined form the list and the center may be determined by the cell's index.

The 3D structure of the cells is stored as a vector. The cells are stored as a one-dimensional list. The cells are accessed from the one-dimensional list as a function of an index-shift. The relation between a cell index in three-dimensional space and the cell's actual memory location is given by an index function. Given a regular distribution of cells in three dimensions, the resulting one dimensional storage vector has a regular pattern of cells representing different rows, columns, and planes. The cells of each row are sequential in the index, where each row at a given column is offset by a first index value, the number of grid elements in a column (e.g., when there are 10 columns—row 1 is 0-9, row 2 is 10-19, etc.). The repetition occurs in a similar manner for the planes using a second index value equal to the number of elements in a plane (rows X columns). Due to this regular distribution in the memory, a pattern of index shifts for acquiring all of the cells surrounding a given cell may be determined quickly. The grid index for the center of a fragment's bounding volume can be determined with simple shifts and multiplications. To determine the extent of the overlap, the first and second indices can be used to determine adjacent columns and planes.

During each simulation step, the internal forces are calculated for all particles, collisions between fluid and the solid object are treated as external forces with respect to the fluid. Using the combination of internal and external forces, the fluid is advected. The reverse of the external forces are applied to the solid objects. In acts 28 and 30, boundary handling in the simulation is performed to determine where external forces occur. For a given solid object, the collision handling is determined for all the bounding volumes of the object.

In act 28, the slab cut balls for the fragments are mapped to the cells or vise versa. The problem can be redefined as associating a solid fragment with a set of grid cells. The mapping finds the cells intersecting the spherical extent of the slab cut ball. The center and radius of each slab cut ball defines the volume or spatial extent of the slab cut ball or sphere used to make the slab cut ball. Any cells overlapping with the volume or spatial extent are identified.

Any search pattern may be used to map. For example, $C_f$ is first mapped to a three-dimensional index of a cell. The one-dimensional index of that cell is then calculated. With knowledge of $R_f$, the block size is determined such that a bounding volume is encompassed by the cell block. For example, a block size can be calculated as in equation 6.

$$|block| = \left(2\left\lceil \frac{R_f}{h} \right\rceil + 1\right)^3 \quad (6)$$

The block is used to determine the range of intersecting cells with a given bounding volume. The search may be limited for each bounding block to only those overlapping the bounding volume, resulting in computational efficiency.

Given $C_f$ and $R_f$, finding which cells intersect with a bounding volume is straightforward. However, since the goal is to make boundary handling fast, nested loops may be avoided by utilizing the one-dimensional storage structure of the three-dimensional grid or distribution of cells. Once one cell is identified, the surrounding cells may be accessed and tested for intersection of the cell with the volume of the slab cut ball. The one-dimensional storage structure is used to access neighboring cells by a simple shift operation of the one-dimensional index. In a preprocessing step, the size of the one-dimensional index shift for each direction between neighboring cells is calculated. Since the number of cells overlapped along each cube's edge is dependent on the radius of the bounding volume, the index-shift array is calculated relative to some central cell. The same data structure may be used for a block of any size by stopping at the appropriate index. For example, to expand out one grid cell in radius, the first nine offsets may be used. The expand out two grid cells in radius, the first twenty-seven offsets may be used. The size of the largest bounding volume determines how large the array of indices needs to be. The data within surrounding cells are accessed using the index and fetching the cell data from the 1D array of cell information.

For other slab cut balls, the spatial relationship of the slab cut balls to each other is used to restrict which grid cells are searched. Alternatively, an independent overlap analysis for each slab cut ball with the cells is performed.

In act 30, collision of particles simulating the fluid with the boundary is detected. The detection is performed as a function of the slab cut balls. The bounding volumes are used to detect which particles may be in collision with the object. Where one or more particles intersect or are on an interior side of the fragment as determined by collision with a fragment primitive, collisions occur. By testing for the position of particles relative to the fragments, the forces acting on the particles and object due to collision may be calculated.

The cells intersecting or overlapping the ball or sphere portion of the bounding volumes are mapped in act 28. In act 30, the particles within the cells are tested to determine whether the particles collide with the fragment. Any testing may be used.

In one embodiment, a center of each intersecting cell is compared to the slab cut ball. If the center of the cell is outside the radius or the cutting planes of the slab cut ball, then no collision has occurred. For example, FIG. 5 shows the center of a cell 40 is not inside the slab cut ball even through the grid cell does overlap with the slab cut ball. The particles of the cell 40 are treated as not having collided with the object if the center of the cell is not inside the slab cut ball. Given the size relationship between the cells and the slab cut balls, this assumption is accurate or at least, on average, sufficient. Rather than making this assumption, the positions of the particles within each cell may be tracked and tested. For any intersecting cells, the particles of the cell are then individually tested for collision with the fragment.

For example, a bounding volume (BV) of fragment f has attributes $C_f$, $R_f$, $\hat{n}_f$, $d_1$, and $d_2$. The associated fragment f is defined as a list of primitives of length N. The following process is performed to detect collision.

(1) update $C_f$ and $\hat{n}_f$
(2) locate cells within BV (act 28)
(3) if cell not empty
(4) if cell center inside radius and between cutting planes
(5) for all particles within cell
(6) for all primitives within fragment
(7) if collision (particle, primitive)
(8) calculate forces (act 32)

For testing whether the center of the cell is inside the radius and between the cutting planes, the center of each cell is pre-computed and stored, such as during the initialization in act 24. Alternatively, the center is determined as needed. A point P is within cutting planes if the projection of point P orthogonal to the normal direction of the slab cut ball is greater than $d_2$ and less than $d_1$. In other words, $d_2 \le (P-C_f) \cdot \hat{n}_f \le d_1$.

A particle is in collision with a primitive's plane when the particle penetrates a distance d into the solid object from that plane. For example, $d = D - (\hat{n} \cdot p_i)$, where D is the planar distance to the primitive's surface (smallest distance from the particle to a point on the primitive), and $\hat{n}$ is the unit surface normal. Other collision detection for the particle may be used, such as determining a transition from outside to inside the fragment.

If the center of the grid cell is outside the slab cut ball, the cell is considered far from the fragment and ignored. If the center is outside the slab, even if within the sphere or ball, a collision of the particles with the fragment is assumed to have not occurred.

In act 32, the interaction force of the collision is determined. Any force calculation may be used to represent the force from collision with a rigid or semi-rigid body. The force is added to the colliding particle and its opposite to the object. This force is an external force for the particle. A particle i has location $p_i$ and forces $F_i = F_i^{internal} + F_i^{external}$. The boundary force on the particle is calculated as the summation of error-correction force $F_i^{error}$ and a counter force $F_i^{counter}$ as follows:

$$F_i^{counter} = -\hat{n} \times (\hat{n} \cdot F_i) F_i^{error} = C \times d \times \hat{n}$$

where $$C = \frac{\rho_i}{\Delta t^2}$$

is a constant, proportional to particle's density $\rho_i$ and inversely proportional to the square of simulation time step $\Delta t$.

$$F_i = F_i^{internal} + F_i^{external} + F_i^{counter} + F_i^{error}$$

The purpose of $F_i^{counter}$ is to counter any forces exerted on particle i in a direction of normal $\hat{n}$, so $F_i^{counter}$ is weighted negatively.

$F_i^{error}$, on the other hand, is used to correct the penetration distance d that particle i has traveled inside a rigid body's surface. Both $F_i^{error}$ and $F_i^{counter}$ act in the normal direction and thus this constitutes a free-slip condition. The normal for force calculation is normal to the primitive with which the particle collides. Other force calculations with or without free slip or other conditions may be used.

Any other forces acting on the solid object and/or the particles are calculated. The forces are applied to move the particles. Depending on limitations on movement of the solid object, the solid object may move or not due to the application of force. When the solid object changes position, translation and rotation is applied to all the bounding volumes of the fragments. Translation and rotation are applied to the sphere center, and rotation is applied to the normal of the cutting planes. Any other movement, deformation, or changes are applied to the simulation. The next cycle of the simulation then occurs repeating the same steps using the current configuration.

Figure 6:
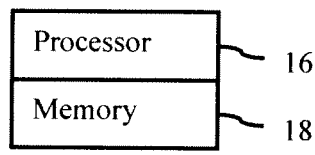
FIG. 6 is block diagram of one embodiment of a system for boundary handling in particle-based simulation.

FIG. 6 shows a block diagram of a system for particle-based fluid simulation using slab cut balls. The system includes a processor 16 and a memory 18. Additional, different, or fewer components may be provided. For example, an input device, such as a network card, wireless transceiver, and/or user input device are provided. As another example, a display, printer, network card, wireless transceiver and/or other output device is provided.

The computer processing performed by the processor 16 may be implemented in various forms of hardware, software, firmware, special purpose processors, or a combination thereof. Some embodiments are implemented in software as a program tangibly embodied on a non-transitory program storage device. By implementing with a system or program, boundary handling in particle-based simulation is performed by the processor 16.

The processor 16 and/or memory 18 are part of a computer, personal computer, server, workstation, network processor, or other now know or later developed processing system. Various peripheral devices such as, for example, a display device, a disk storage device (e.g., a magnetic or optical disk storage device), a keyboard, a printing device, and a mouse, may be operatively coupled to the processor 16. A program may be uploaded to, and executed by, the processor 16. Likewise, processing strategies may include multiprocessing, multitasking, parallel processing and the like. The processor 16 is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 16 is one or more processors in a network.

The instructions, user input (map confirmation or alteration), rules, and/or other information are stored in a non-transitory computer readable memory, such as the memory 18. The memory 18 is an external storage device, internal storage device, RAM, ROM, and/or a local memory (e.g., solid state drive or hard drive). The same or different computer readable media may be used for the instructions and other data, such as the cell and fragment information. The memory 18 may be implemented using a database management system (DBMS) managed by the processor 16 and residing on a memory, such as a hard disk, RAM, or removable media. Alternatively, the memory 18 is internal to the processor 16 (e.g. cache). The memory 18 stores data used by or resulting from the particle-based fluid simulation.

The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method steps depicted in the accompanying figures are preferably implemented in software, the actual connections between the system components (or the process steps) may differ depending upon the manner in which the present embodiments are programmed.

The processor 16 is configured to perform the simulation. The processor 16 receives an indication of the parameters for the simulation, such as the number, size, shape, density, and/or other characteristics of the solid objects and particles. The initialization acts are performed by the processor 16 to prepare for the simulation. Alternatively, the processor 16 receives previously calculated initialization information, such as receiving an indication of storage location of bounding volumes, cells, fragments, and/or other information. The processor 16 performs the simulation, such as simulating fluid flow and interaction with one or more objects. The effect on the objects may also be simulated. The results of the simulation are output as images or data.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for boundary handling in particle-based simulation, the method comprising:
    dividing, with a processor, a solid object into a plurality of fragments;
    forming, with the processor, a slab cut ball for each of the fragments of the plurality;
    defining, with the processor, a three-dimensional distribution of simulated particles grouped into cells;
    mapping, with the processor, the slab cut balls for the fragments to the cells, wherein the mapping finds cells intersecting with volumes associated with the slab cut balls, and wherein the cells have a shape different than the slab cut balls;
    detecting, with the processor and for the cells intersecting with the volumes, that at least one simulated particle of one of the cells intersects with the slab cut ball of one of the fragments;
    detecting, for the at least one simulated particle intersecting with the slab cut ball of the one of the fragments, the collision of at least one simulated particle with one of the primitives of the fragment; and
    calculating, with the processor, an interaction force of the collision.

2. The method of claim 1 wherein the solid object is modeled as a mesh of primitives in an axis aligned bounding box, wherein dividing comprises separating the primitives into the fragments until each fragment is less than a maximum, and wherein forming comprises forming the slab cut balls for each of the fragments less than the maximum.

3. The method of claim 1 wherein dividing comprises iteratively performing the dividing as a binary division of an axis aligned bounding box of the solid object or part of the solid object.

4. The method of claim 1 wherein dividing and forming comprise initialization acts, wherein mapping, detecting the intersection, detecting the collision, and calculating comprise acts for simulation of interaction of the solid object with fluid, wherein the initialization acts are performed prior to the acts for the simulation of interaction of the solid object with fluid, and wherein acts for the simulation of interaction of the solid object are performed repetitively without further performance of the initialization acts.

5. The method of claim 1 wherein forming for each fragment comprises:
    determining a centroid of the slab cut ball as a function of centroids of primitives of the fragment;
    determining a radius enclosing the primitives;
    determining a calculated normal of the primitives;
    defining cut planes orthogonal to the calculated normal at distances relative to the centroid of the slab cut ball such that the primitives are between the cut planes, wherein the slab cut ball comprises the cut planes and a part of a sphere centered at the centroid of the slab cut ball and having the radius, wherein the part of the sphere is between the cut planes.

6. The method of claim 1 wherein each fragment comprises primitives, and wherein forming for each fragment comprises calculating an orientation as an average normal of primitives.

7. The method of claim 1 wherein forming comprises forming the slab cut balls independently of each other.

8. The method of claim 1 wherein defining comprises defining each cell as a function of three-dimensional location of a center of the cell and a list of the simulated particles within the cell.

9. The method of claim 1 further comprising storing the cells as a one-dimensional list and accessing the cells from the one-dimensional list as a function of an index-shift, wherein the index-shift is a function of a radius of the slab cut ball.

10. The method of claim 1 wherein mapping comprises finding the cells intersecting each slab cut ball as a function of a centroid and radius of each slab cut ball, wherein the finding is performed without a bounding hierarchy.

11. The method of claim 1 wherein detecting the intersection comprises testing whether a center of the one of the cells is inside the radius and between cutting planes of the slab cut ball.

12. The method of claim 1 wherein mapping, detecting the intersection, detecting the collision, and calculating are iteratively performed to represent fluid interaction with the solid object; and
    further comprising:
    calculating internal forces for the simulated particles; and
    advecting the solid object within the fluid as a function of the collisions.

13. A non-transitory computer readable storage medium having stored therein data representing instructions executable by a programmed processor for boundary handling in particle-based simulation, the storage medium comprising instructions for:
    separating a mesh of primitives representing an object into sub-sets of primitives;
    defining a three-dimensional distribution of simulated particles grouped into cells; and
    detecting collision of particles with the object as a function of bounding volumes comprising slab cut balls, wherein the detecting comprises detecting that at least one of the particles intersects with at least one of the slab cut balls.

14. The non-transitory computer readable storage medium of claim 13 wherein separating comprises defining the slab cut balls for different fragments of the mesh, wherein the slab cut balls are independent of each other such that the detecting is performed free of a bounding hierarchy.

15. The non-transitory computer readable storage medium of claim 13 wherein separating the mesh comprises binary separation of the mesh repeated until the sub-sets are less than a threshold volume, size or number of members.

16. The non-transitory computer readable storage medium of claim 13 wherein separating comprises defining the slab cut balls for the respective sub-sets, wherein each of the bounding volumes is independent of the other bounding volumes.

17. A non-transitory computer readable storage medium having stored therein data representing instructions executable by a programmed processor for boundary handling in particle-based simulation, the storage medium comprising instructions for:
   separating a mesh of primitives representing an object into sub-sets of primitives; and
   detecting collision of particles with the object as a function of bounding volumes comprising slab cut balls;
   wherein separating comprises defining the slab cut balls for the respective sub-sets with an orientation of each slab cut ball being calculated as an average normal of the primitives in the respective sub-set.

18. The non-transitory computer readable storage medium of claim 13 further comprising:
   grouping the particles into a three-dimensional distribution of cells; and
   wherein detecting comprises determining that a center of a cell is inside the radius and between cutting planes of one of the slab cut balls.

19. A non-transitory computer readable storage medium having stored therein data representing instructions executable by a programmed processor for boundary handling in particle-based simulation, the storage medium comprising instructions for:
   creating independent bounding volumes of the boundary as slab cut balls;
   defining a three-dimensional distribution of simulated fluid particles grouped into cells; and
   detecting collision of particles of fluid with the boundary as a function of the slab cut balls, wherein detecting comprises detecting that at least one of the particles of the fluid intersects with the slab cut ball of one of the bounding volumes of the boundary.

20. The non-transitory computer readable storage medium of claim 19 wherein creating comprises defining each of the slab cut balls with an orientation, wherein the orientation of each of the slab cut balls is a function of a normal of at least one primitive of the boundary associated with the bounding volume.

21. The non-transitory computer readable storage medium of claim 19 wherein creating comprises binary dividing the boundary into fragments, the fragments formed by repeating the binary division, and forming the slab cut balls about the fragments.

* * * * *